United States Patent
Ko et al.

(10) Patent No.: US 10,805,137 B2
(45) Date of Patent: Oct. 13, 2020

(54) REFERENCE SIGNAL HAVING FLEXIBLE STRUCTURE

(71) Applicant: LG ELECTRONICS INC., Seoul (KR)

(72) Inventors: Hyunsoo Ko, Seoul (KR); Kijun Kim, Seoul (KR); Eunsun Kim, Seoul (KR); Suckchel Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/250,293

(22) Filed: Jan. 17, 2019

(65) Prior Publication Data

US 2019/0149382 A1 May 16, 2019

Related U.S. Application Data

(63) Continuation of application No. 15/692,589, filed on Aug. 31, 2017, now abandoned.

(60) Provisional application No. 62/405,254, filed on Oct. 7, 2016.

(51) Int. Cl.
| | | |
|---|---|---|
| *H04L 27/26* | (2006.01) | |
| *H04W 72/04* | (2009.01) | |
| *H04L 5/00* | (2006.01) | |
| *H04L 25/02* | (2006.01) | |

(52) U.S. Cl.
CPC .......... *H04L 27/2662* (2013.01); *H04L 5/006* (2013.01); *H04L 5/0017* (2013.01); *H04L 5/0051* (2013.01); *H04L 25/0222* (2013.01); *H04L 25/0226* (2013.01); *H04L 27/2613* (2013.01); *H04W 72/0446* (2013.01); *H04L 5/0007* (2013.01); *H04L 5/0026* (2013.01); *H04W 72/0453* (2013.01)

(58) Field of Classification Search
CPC . H04L 27/2662; H04L 5/0017; H04L 5/0051; H04L 5/006; H04L 25/0222; H04L 25/0226; H04L 27/2613; H04L 5/0007; H04W 72/0446; H04W 72/0453
See application file for complete search history.

(56) References Cited

U.S. PATENT DOCUMENTS

| | | | | |
|---|---|---|---|---|
| 9,084,238 | B2 * | 7/2015 | Gao | H04L 5/0016 |
| 2012/0213147 | A1 * | 8/2012 | Noh | H04L 5/0026 |
| | | | | 370/315 |
| 2013/0208604 | A1 * | 8/2013 | Lee | H04L 25/0226 |
| | | | | 370/252 |
| 2014/0119301 | A1 * | 5/2014 | Park | H04L 5/0091 |
| | | | | 370/329 |
| 2015/0230211 | A1 * | 8/2015 | You | H04L 5/0051 |
| | | | | 370/330 |
| 2016/0248562 | A1 * | 8/2016 | Nam | H04L 27/2601 |
| 2017/0086153 | A1 * | 3/2017 | Yoon | H04W 56/001 |

(Continued)

*Primary Examiner* — Jaison Joseph
(74) *Attorney, Agent, or Firm* — Dentons US LLP

(57) ABSTRACT

A method and a device to transmit a reference signal (RS) in a wireless communication system are disclosed. The device transmits control information and a first type RS for demodulating the control information through a control region comprising 1 first OFDM (Orthogonal Frequency Division Multiplexing) symbol of a subframe; and transmits data through a data region comprising a predetermined number of OFDM symbols following the control region of the subframe. Here, the first type RS can be used also for demodulating the data when a predetermined condition is met.

10 Claims, 10 Drawing Sheets

(56) References Cited

U.S. PATENT DOCUMENTS

| | | | |
|---|---|---|---|
| 2017/0264414 A1* | 9/2017 | Froberg Olsson ... | H04B 7/0413 |
| 2017/0353946 A1* | 12/2017 | Rico Alvarino ........ | H04W 4/70 |
| 2017/0359820 A1* | 12/2017 | Gaal ....................... | H04W 4/70 |
| 2018/0063736 A1* | 3/2018 | Sadeghi ............ | H04W 72/0446 |
| 2019/0190673 A1* | 6/2019 | Kwak ................... | H04L 5/0048 |
| 2019/0199417 A1* | 6/2019 | Noh ..................... | H04B 7/0456 |
| 2019/0222274 A1* | 7/2019 | Dou ....................... | H04B 7/024 |

* cited by examiner

| 0 | 1 | 2 | 3 | 4 | 5 | 6 | 7 | 8 | 9 | 10 | 11 |
|---|---|---|---|---|---|---|---|---|---|----|----|
| G1 | G1 | G2 | G2 | G1 | G1 | G2 | G2 | G1 | G1 | G2 | G2 |

(A)

| 0 | 1 | 2 | 3 | 4 | 5 | 6 | 7 | 8 | 9 | 10 | 11 |
|---|---|---|---|---|---|---|---|---|---|----|----|
| G1 | G2 | G1 | G2 | G1 | G2 | G1 | G2 | G1 | G2 | G1 | G2 |

(B)

REFERENCE SIGNAL HAVING FLEXIBLE STRUCTURE

CROSS-REFERENCE

The present application is a continuation of U.S. patent application Ser. No. 15/692,589 filed Aug. 31, 2017, now allowed, which claims the benefit of U.S. Provisional Application No. 62/405,254, filed on Oct. 7, 2016, all of which are hereby incorporated by reference in their entirety for all purposes as if fully set forth herein.

BACKGROUND OF THE INVENTION

Field of the Invention

The following description relates to a method of transmitting and receiving a reference signal having a flexible structure according to a system situation in a wireless communication system and an apparatus therefor.

Discussion of the Related Art

Recently, standardization of mobile communication technology has reached studies on 5th Generation (5G) mobile communication via 4th Generation (4G) mobile communication technology such as LTE and LTE-A. In 3GPP, 5G mobile communication is referred to as New Radio (NR).

It is apparent that design requirements of an NR system up to now are considerably diverse. For example, a used frequency band ranges from 700 MHz to 70 GHz, system bandwidth ranges from 5 MHz to 1 GHz, and mobile velocity ranges from 0 km/h to 500 km/h. In addition, a use environment demands support for various situations such as an indoor environment, an outdoor environment, and a large cell.

In a situation in which the above-described various requirements must be satisfied, the most general design direction is to design a system on the assumption of the worst of the above various environments. This is identically applicable to transmission of a Demodulation Reference Signal (DMRS), which is a Reference Signal (RS) used to demodulate data and/or control information.

However, design of an NR DMRS using a single pattern on the assumption of an extreme environment may be considerably inefficient in terms of resource efficiency. On the other hand, design of the NR DMRS using various patterns is problematic in that implementation complexity increases.

To solve the above problems, a description will be given of a scheme of hierarchically configuring a DMRS as a basic DMRS and an additional DMRS and transmitting and receiving a flexible RS using the basic DMRS and the additional DMRS.

Additionally, in a specific situation, a scheme of using an RS for control information demodulation as an RS for data demodulation will be described.

SUMMARY OF THE INVENTION

Accordingly, the present invention is directed to a method of transmitting and receiving a reference signal having a flexible structure according to system situation in a wireless communication system and an apparatus therefor that substantially obviate one or more problems due to limitations and disadvantages of the related art.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To meet the above object, in one aspect of the present invention, a method for a device to transmit a reference signal (RS) in a wireless communication system comprises: transmitting control information and a first type RS for demodulating the control information through a control region comprising 1 first OFDM (Orthogonal Frequency Division Multiplexing) symbol of a subframe; and transmitting data through a data region comprising a predetermined number of OFDM symbols following the control region of the subframe, wherein the first type RS is used also for demodulating the data when a predetermined condition is met, if provided.

The predetermined condition may comprise: a number of layers of the data is smaller than a threshold, and user specific beamforming is not applied for transmitting the data.

The method may further comprise: transmitting a second type RS for demodulating the data through the data region, wherein the second type RS can be generated with a same kind of sequence as the first type RS.

Preferably, a combination of the first type RS and the second type RS is used for demodulating the data.

A base station may inform a user equipment (UE) whether the first type RS is to be used for demodulating the data.

Preferably, the subframe may comprise: a first control region comprising the first OFDM symbol of the subframe for transmitting downlink control information, a second control region comprising a last OFDM symbol of the subframe for transmitting uplink control information, and the data region between the first control region and the second control region.

The first type RS may comprise a DMRS (Demodulation Reference Signal).

In another aspect of the present invention, a device for transmitting a reference signal (RS) in a wireless communication system comprises: a transceiver transmitting control information and a first type RS for demodulating the control information through a control region comprising 1 first OFDM (Orthogonal Frequency Division Multiplexing) symbol of a subframe, and transmitting data through a data region comprising a predetermined number of OFDM symbols following the control region of the subframe; and a processor controlling the transceiver and configuring the first type RS to be used also for demodulating the data when a predetermined condition is met.

The predetermined condition may comprise: a number of layers of the data is smaller than a threshold, and user specific beamforming is not applied for transmitting the data.

The processor may control the transceiver to transmit a second type RS for demodulating the data through the data region, wherein the processor can generate the second type RS with a same kind of sequence as the first type RS.

The processor may configure a combination of the first type RS and the second type RS to be used for demodulating the data.

The device may comprise a base station, and the processor may be configured to inform a user equipment (UE) whether the first type RS is to be used for demodulating the data.

The subframe may comprise: a first control region comprising the first OFDM symbol of the subframe for transmitting downlink control information, a second control region comprising a last OFDM symbol of the subframe for transmitting uplink control information, and the data region between the first control region and the second control region.

The first type RS may comprise a DMRS (Demodulation Reference Signal).

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention.

As described above, an aspect of the present invention provides a method of transmitting a DMRS in a wireless communication system. An embodiment for this method proposes that a basic DMRS be transmitted through the first Orthogonal Frequency Division Multiplexing (OFDM) symbol in a data transmission region of a predetermined subframe and an additional DMRS be transmitted in the predetermined subframe according to a level determined based on a transmission environment.

Herein, the basic DMRS is transmitted through the first OFDM symbol in the data transmission region of the predetermined subframe regardless of a transmission link, a subframe structure, and a transmission environment. The reason why the basic DMRS is transmitted through the first OFDM symbol in the data transmission region of the predetermined subframe is to aid in early decoding of data and to measure/eliminate inter-cell interference.

As described above, the basic DMRS refers to an RS which is always transmitted regardless of a link (i.e., downlink (DL)/uplink (UL)/sidelink (SL)), numerology (a subcarrier spacing or an OFDM symbol duration), a transmission layer (rank 1 to N), a deployment scenario (an indoor or outdoor environment), velocity (0 to 500 km/h), and a Transport Block Size (TBS). It is assumed in NR that the basic DMRS is located at a front part of a data region of a subframe. In NR, early decoding of data is an important requirement of design. By transmitting the DMRS prior to a data signal, channel estimation information necessarily demanded for data decoding can be rapidly obtained.

A factor that should be considered in association with the position of the basic DMRS is a frame structure used in NR. In an NR system, it is expected that a Time Division Duplex (TDD) scheme will be mainly used due to a pilot contamination problem caused by introduction of massive Multiple Input Multiple Output (MIMO).

Figure 1:
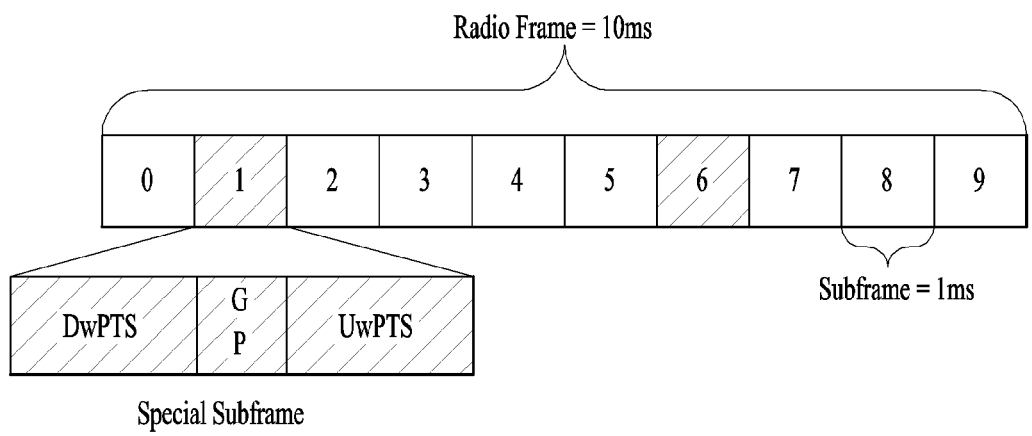
FIG. 1 is a diagram illustrating the structure of a TDD radio frame.

FIG. 1 is a diagram illustrating the structure of a TDD radio frame.

While the structure of the TDD radio frame illustrated in FIG. 1 is a radio frame structure in a 4G LTE system, the corresponding structure may be used unless particularly mentioned otherwise hereinbelow.

The TDD radio frame of the LTE system is 10 ms in length and includes 10 subframes. One subframe is 1 ms in length. In FIG. 1, special subframes such as subframe 1 and subframe 6 are subframes for DL/UL switching and each special subframe includes a DL Pilot Time Slot (DwPTS) having a length of 3 to 12 OFDM symbols, a Guard Period (GP) having a length of 1 to 10 OFDM symbols, and a UL Pilot Time Slot (UpPTS) having a length of one or two OFDM symbols.

In the structure of the 4G LTE radio frame illustrated in FIG. 1, one Transmission Time Interval (TTI) is 1 ms in length and corresponds to one subframe.

Figure 2:
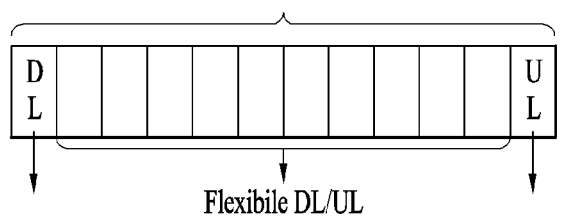
FIG. 2 is a diagram illustrating the structure of a subframe in an NR system according to an embodiment of the present invention.

FIG. 2 is a diagram illustrating the structure of a subframe in an NR system according to an embodiment of the present invention.

In a 5G mobile communication system, if communication is performed based on a TDD scheme, it is proposed that a subframe structure sequentially including a DL dedicated duration, a UL or DL flexible duration, and a UL dedicated duration be used as illustrated in FIG. 2. This structure can prevent a response to a signal transmitted on a link of any one direction from being excessively delayed and perform flexible communication by configuring a flexible duration according to system situation.

The subframe structure as illustrated in FIG. 2 may be referred to as a self-contained frame structure. In such a self-contained frame structure, the DL dedicated duration may be used to transmit DL control channel information, the flexible duration may be used to transmit a data channel, and the UL dedicated duration may be used to transmit a UL control channel.

In association with the position of the basic DMRS, the following factors should be considered. That is, a frame structure in NR is designed for the purpose of being commonly used by DL/UL/SL and DMRS positions of DL/UL/SL should be equalized in a subframe in order to estimate a channel of an interference signal received from a neighbor cell or a neighbor link.

Figure 3:
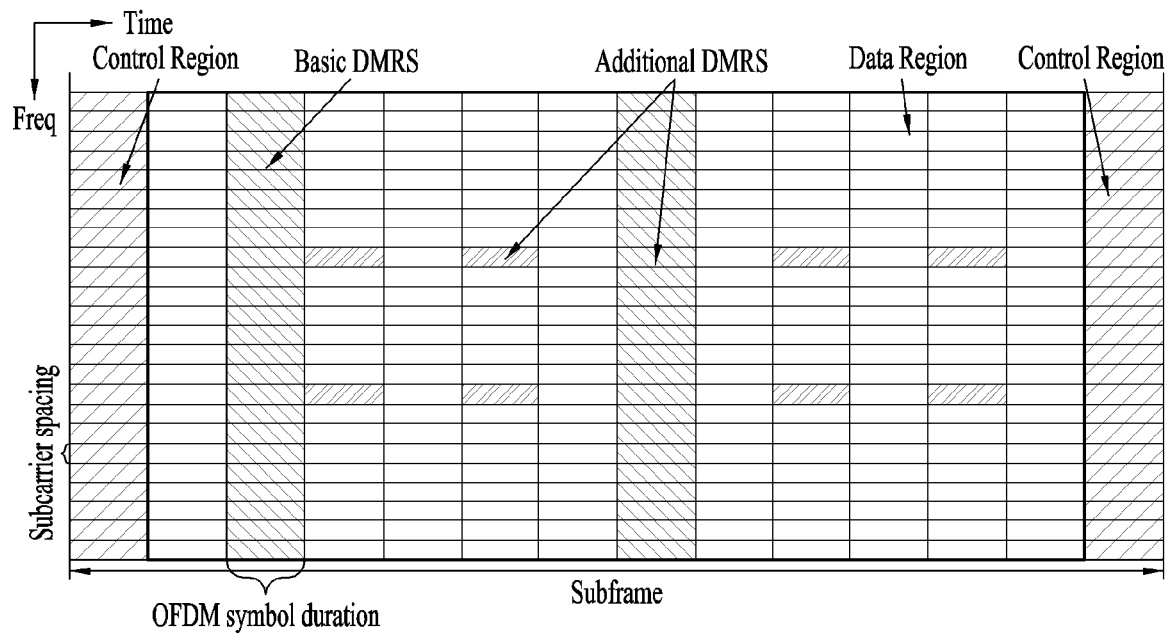
FIGS. 3 and 4 are diagrams for explaining a method of transmitting a basic DMRS and an additional DMRS according to an embodiment of the present invention.
Figure 4:
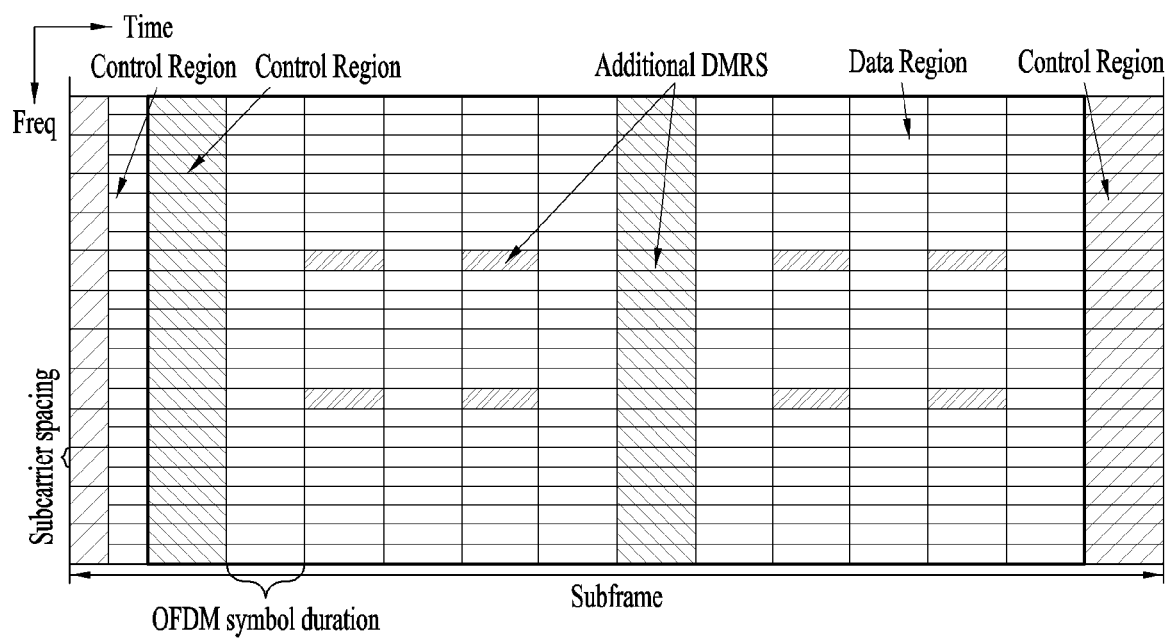

FIGS. 3 and 4 are diagrams for explaining a method of transmitting a basic DMRS and an additional DMRS according to an embodiment of the present invention.

As illustrated in FIGS. 3 and 4, in a subframe structure considered in NR, starting points of a DL data region and a UL data region may differ according to the length of a DL control region and presence of a guard period.

For example, if DL data is transmitted subsequent to the first OFDM symbol on which a control channel is transmitted, a data region may be started beginning from the second OFDM symbol. If UL data is transmitted subsequent to the first OFDM symbol on which the control channel is transmitted, the second OFDM symbol may be used as the guard period and data may be transmitted starting from the third OFDM symbol.

Thus, since the starting points of the DL data and the UL data may become different, it is desirable to deploy the basic DMRS on the first symbol among OFDM symbols commonly used for data transmission in a DL data region and a UL data region. FIG. 3 illustrates transmission of the basic DMRS on the third OFDM symbol according to the above-described principle.

Meanwhile, the length of OFDM symbols of a control region and the length of OFDM symbols of a data region may differ. Even in this case, similarly to the foregoing example, the basic DMRS may be deployed on the first OFDM symbol among OFDM symbols commonly used for data transmission in the DL data region and the UL data region after OFDM symbols occupied by the DL control region and the guard time. For example, FIG. 4 illustrates the case in which both the DL control region and the guard time are configured on the first OFDM symbol. Herein, the basic DMRS may be transmitted on the second OFDM symbol.

The additional DMRS may be located at a specific position of the data region and may be divided into two types as follows.

(1) Type-1 additional DMRS: This type means a DMRS using a part of Resource Elements (REs).

(2) Type-2 additional DMRS: This type means a DMRS using all of one OFDM symbol.

If the additional DMRS is used in units of OFDM symbols (if Type-2 DMRS is used), the additional DMRS may be deployed at a position at which the number of OFDM symbols located after an OFDM symbol used as the basic DMRS is equal or similar to the number of OFDM symbols located after an OFDM symbol used as the additional DMRS. For example, if 12 OFDM symbols are present in a data region and the basic DMRS is located on the second OFDM symbol as illustrated in FIG. 3, the additional DMRS may be deployed on the seventh OFDM symbol. As another example, if 12 OFDM symbols are present in the data region and the basic DMRS and two additional DMRSs are present, when the basic DMRS and the two additional DMRSs are deployed on the first, fifth, and ninth OFDM symbols, respectively, the numbers of OFDM symbols located after the respective DMRSs are similar to each other. This is advantageous in that DMRSs make good use of channel estimation variation.

Meanwhile, according to another embodiment of the present invention unlike the above-described embodiment, if the additional DMRS is used in units of OFDM symbols (if Type-2 DMRS is used), the additional DMRS may be arranged on an OFDM symbol subsequent to an OFDM symbol used as the basic DMRS. For example, if the basic DMRS is located on the second OFDM symbol, the additional DMRS may be deployed on the third OFDM symbol. This has advantages of increasing DMRS resources for the purpose of expanding the number of antenna ports (APs) in MIMO transmission or expanding the number of users performing simultaneous transmission.

The additional DMRS may be categorized into levels according to the number of REs of an added DMRS. The number of REs of the added DMRS, that is, an additional DMRS level, may be adjusted according to a transmission environment. One of multiple additional DMRS levels desirably corresponds to the case in which only a basic RS is transmitted. That is, additional DMRS level 0 may correspond to the case in which only the basic RS is transmitted.

The additional DMRS in units of REs may be deployed at an equal interval in a Resource Block (RB) as illustrated in FIGS. 3 and 4. Generally, in the additional DMRS in units of REs, APs having the same number as APs defined in the basic DMRS are defined. However, for a special usage as in the case in which the additional DMRS in units of REs is used to measure a phase variation between OFDM symbols and phase variations are similar in all APs, only the additional DMRS of fewer APs than APs defined in the basic DMRS may be defined.

Herein, the basic DMRS may be referred to as a fundamental DMRS, a primary DMRS, etc. and the additional DMRS may be referred to as a high-quality RS, a high-performance RS, a supplemental DM-RS, a secondary DM-RS, an add-on DMRS, etc. In addition, terms other than DMRS may be used to refer to an RS which can be used to demodulate data/control information.

Method of Varying Density of DMRSs

As a method of varying density of DMRSs, an additional RS may be added on an on-demand basis while maintaining a legacy RS. For example, such an additional RS may be added in the case in which Doppler or delay spread increases or in a high Modulation and Coding Scheme (MCS) according to an MCS level.

As the method of varying density of DMRSs, more RSs or fewer RSs may be flexibly transmitted on an on-demand basis to a user that permits flexible density according to capabilities of a receiver. For example, if the receiver is capable of performing analog beamforming, it is requested that fewer RSs be transmitted on an on-demand basis with respect to RSs transmitted on the assumption of omnidirectional reception.

In a channel over which a paging signal, a random access response, and system information are transmitted, density of RSs may be fixed, and in a channel over which information is transmitted to a specific UE, density of RSs may be varied.

RS density control information among grant messages for channel decoding may be defined. That is, information about RS density used in a currently transmitted channel (use of default density, increase of density, or decrease of density) may be provided in the following form.

Information about RS density to be used over a channel to be transmitted (default density or increase/decrease of density)
Information about an additional DMRS level
Information about an additional DMRS type
Triggering message for reporting the amount of channel variation After performing short-term measurement (Channel State Information (CSI-RS)), a UE may report the amount of channel variation (of time and frequency) together with CSI. Reporting of the amount of channel variation may be an index for determining whether to vary RS density. In addition, the UE may report a message for requesting a flexible RS density.

Upon reporting CSI (Rank Indicator (RI)/Precoding Matrix Indicator (PMI)/Channel Quality Indicator (CQI)), the UE may report information about a preferred additional DMRS level. The preferred additional DMRS level corresponds to an additional DMRS level that can obtain optimal throughput while the UE receives a Physical Downlink Shared Channel (PDSCH) of an MCS corresponding to a reported CQI. Upon calculation of the CSI, the UE may factor in added DM-RS RE overhead according to the additional DMRS level.

When the number of transmission layers is increased, an additional RS may be added to a legacy RS.

In a data region indicated by a common control channel or a common control message, it is desirable to basically use an additional DMRS deployed together with a basic DMRS.

When data is indicated by a UE-specific control channel or a UE-specific control message, DMRS density in a subframe is variably used. To this end, a DMRS related indicator may be configured in the control message to indicate DMRS density for a PDSCH or a Physical Uplink Shared Channel (PUSCH) (e.g., through Radio Resource Control (RRC) according to Downlink Control Information (DCI) or format).

The UE that performs analog reception beamforming may request change of DMRS density.

Figure 5:
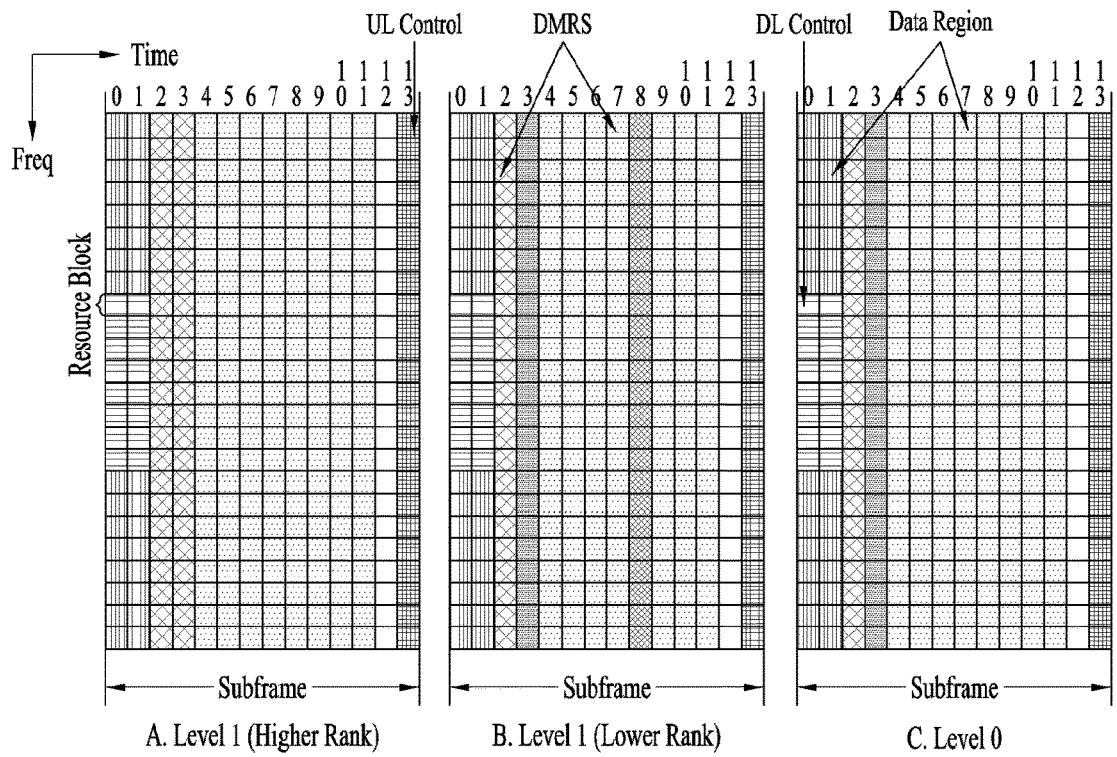
FIGS. 5 and 6 are diagrams for explaining a method of adjusting DMRS transmission density according to an embodiment of the present invention.
Figure 6:
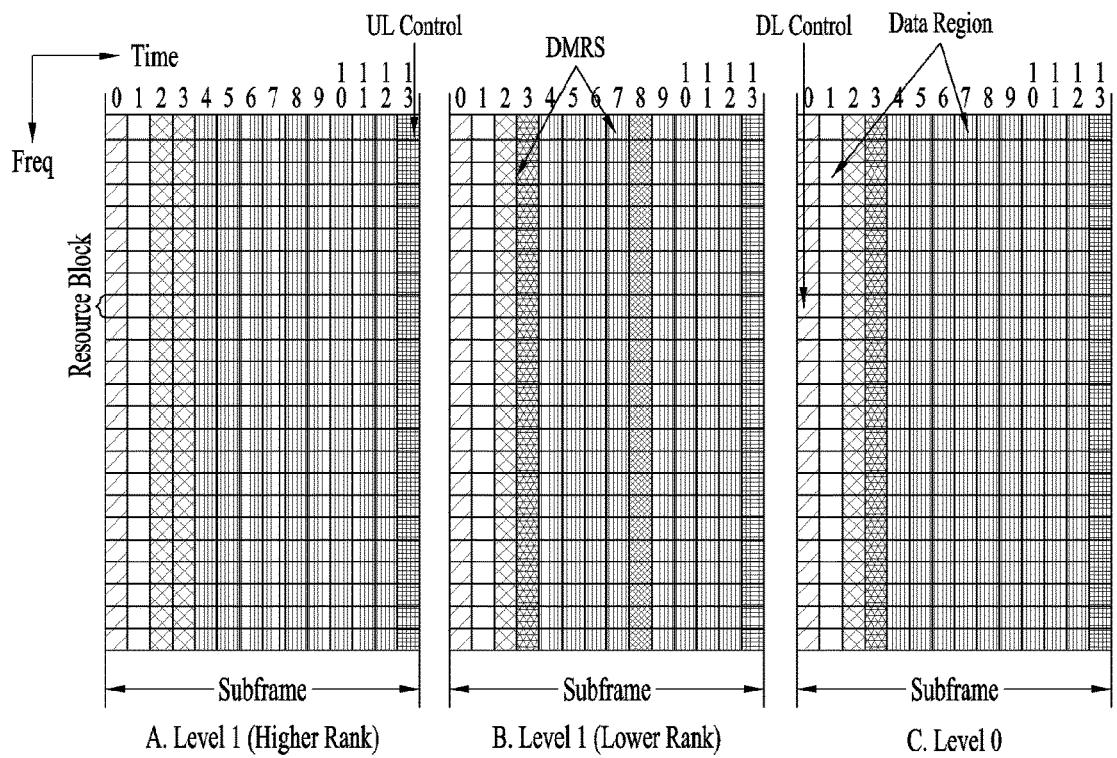

FIGS. 5 and 6 are diagrams for explaining a method of adjusting DMRS transmission density according to an embodiment of the present invention.

Specifically, FIG. 5 is a diagram for explaining a DMRS transmission structure for DL data transmission and FIG. 6 is a diagram for explaining a DMRS transmission structure for UL data transmission.

As illustrated in FIGS. 5 and 6, a Type-2 additional DMRS is categorized into Level 0 and Level 1 according to overhead and the DMRS is used according to each level. In these examples, DMRS positions in UL and DL transmission regions are equalized with each other according to a level of Type-2 additional DMRSs. That is, it is desirable that a DMRS transmission position for DL data transmission not differ from that for UL data transmission according to each level and basic/additional DMRSs be transmitted at the same positions regardless of DL/UL data transmission.

Level 1 corresponds to the case of increasing overhead relative to Level 0 and may be applied for the purpose of improving channel estimation performance during higher rank transmission or lower rank transmission. Level 0 is targeted at lower rank transmission having low RS overhead.

As another example, in FIGS. 5 and 6, "A. Level 1 (Higher Rank)" may be used to improve channel estimation performance during lower rank transmission and "B. Level 1 (Lower Rank)" may be used as a pattern for a higher rank.

FIGS. 5 and 6 exemplarily illustrate frame structures. In these examples, it is assumed that 2 OFDM symbols be used in a DL control region. In a region not used for DL control, DL data transmission or DL data transmission via a guard time may be performed.

Designation of Level that can Perform Interpolation for Improving Channel Estimation In an embodiment of the present invention, a Quasi Co-Location (QCL) condition may be assumed in DMRSs transmitted as multiple levels. For example, if QCL is assumed between a plurality of DMRSs transmitted in a single subframe, a channel estimated from each DMRS may be used for interpolation. If a QCL condition is assumed in multiple subframes, interpolation may be performed on a multi-subframe level basis. If a mini-subframe is defined in a subframe and a DMRS is transmitted on a mini-subframe basis, interpolation between mini-subframes may be performed when QCL of a mini-subframe level is assumed.

The QCL condition may represent a time-domain resource unit capable of performing interpolation as a subframe group or a multi-subframe group.

RS Structure for Measuring Channel State Variation

If a Cell-specific Reference Signal (CRS), which is periodically transmitted at an interval of constant OFDM symbols, or a CSI-RS, which is periodically transmitted in units of subframes, is used as in legacy LTE, a time-varying characteristic of a channel may be measured. Meanwhile, in NR, a single-beamformed RS (having no beam variation in time or frequency) which is transmitted in units of some OFDM symbols like the CRS is not defined.

Since a frame structure supporting dynamic switching of DL/UL and dynamic variation of a transmission beam in units of OFDM symbols and subframes is demanded, it is difficult to periodically transmit a CSI-RS in units of subframes and thus it is difficult to expect that the periodic CSI-RS will be used. In addition, one-shot transmission makes it difficult to measure Doppler spread.

Even though a periodically transmitted RS for beam measurement is introduced, if the RS is not transmitted at a considerably short period, it is difficult to measure variation in a time-varying characteristic of a channel using the beam measurement RS.

Accordingly, a channel measurement RS (e.g., a CSI-RS, a Sounding Reference Signal (SRS), etc.) of NR needs to be designed to be suitable for measurement of variation in the time-varying characteristic of the channel.

A signal structure capable of measuring channel state variation is as follows.

Figure 7:
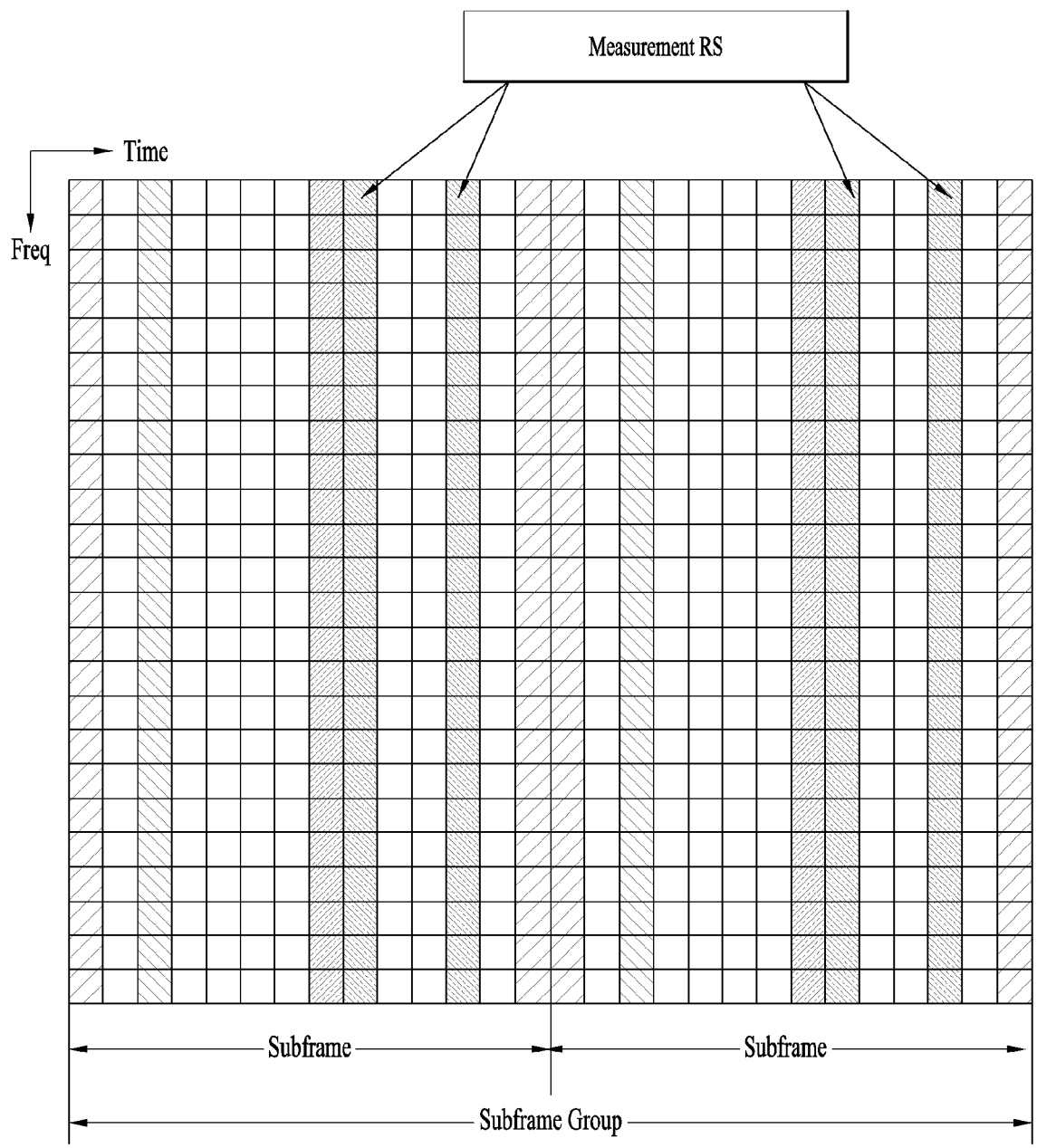
FIG. 7 is a diagram illustrating the concept of a multi-shot measurement RS according to an embodiment of the present invention.

FIG. 7 is a diagram illustrating the concept of a multi-shot measurement RS according to an embodiment of the present invention.

A multi-shot CSI-RS or a multi-shot SRS having no variation in beamforming may be transmitted as illustrated in FIG. 7. The multi-shot CSI-RS or the multi-shot SRS may be transmitted throughout multiple shots in a subframe or multiple shots transmitted in units of contiguous subframes or some subframes. A message (e.g., N-subframe group) based on the premise that there is no variation in a beamforming coefficient may be defined. In addition, a repeatedly transmitted structure on a single OFDM symbol may also be considered.

Upon triggering aperiodic CSI-RS transmission/CSI measurement/CSI reporting through DCI, an eNB may inform a UE whether a corresponding CSI-RS is a single shot CSI-RS or a multi-shot CSI-RS. If the eNB transmits the multi-shot CSI-RS, the UE may report channel variation or a preferred additional DMRS level.

Upon triggering aperiodic SRS transmission through the DCI, the eNB may inform the UE whether a corresponding SRS is transmitted as a single shot SRS or a multi-shot SRS. Alternatively, the eNB may inform the UE of how many times an SRS should be consecutively transmitted using the same precoding scheme.

In addition, for efficient interference measurement, a CSI-Interference Measurement (IM) resource, which is a resource for specifying interference, may be configured as a multi-shot CSI-IM resource. The multi-shot CSI-IM resource may be defined to match a multi-shot CSI-RS resource in one-to-one correspondence. That is, the eNB may indicate, through the DCI, how many times the CSI-RS and CSI-IM resources appear. Unlike this, the eNB may individually indicate, through the DCI, how many times each of the CSI-RS resource and the CSI-IM resource appears.

Meanwhile, according to another aspect of the present invention, a method of sharing an RS by a control channel and a data channel will now be described as one method for providing a flexible RS structure.

Method of Sharing RS by Control Channel and Data Channel

As described above, the NR system considers Time-Division Multiplexing (TDM) of a DL control channel and DL/UL data channel. Basically, in a control channel, an RS for demodulating the control channel may be defined and a DMRS for demodulating a data channel may be defined. If RSs are defined for the control channel and the data channel, RS overhead may considerably increase.

To reduce RS overhead, methods of sharing the control channel RS or the data DMRS in the control channel and the data channel are proposed but it is noted according to an embodiment of the present invention that RS sharing does not always result in gain. For example, the RS of the control channel defines a limited number of APs. If the limited number of APs is applied to the data channel, a maximum transmission rank of the data channel is limited, thereby restricting capacity. In addition, the RS of the control channel may be a UE-specific RS but may be non-UE specific RS. If the RS of the control channel is transmitted as the non-UE specific RS, it is difficult to perform beamforming with respect to a specific UE and thus it is difficult to expect beam gain.

Therefore, RS sharing described above may be permitted only when a predetermined condition is satisfied. For example, the condition may include 1. a UE that transmits information demanding low data rate,
2. a situation in which UE-specific spatial channel information is not obtained or obtained spatial channel information is not valid, or
3. a UE that is favorable for open-loop transmission such as in a high-speed moving environment.

That is, the present embodiment proposes that the data channel share the RS defined in the control channel. In this case, the RS of the control channel may be assumed to be UE group specific. The number of transmission layers of data may be limited by the control channel RS as described previously. In addition, it may be difficult to achieve UE specific beamforming.

In this way, if RS sharing is performed, an RS in a DMRS region may not be used. The RS in the DMRS region may be additionally used for data transmission. According to another embodiment, an additional RS may be arranged in a data region in which the control channel RS is shared.

Using the additional RS is advantageous in that the additional RS is suitably applied to the case in which basic transmission (or fallback scheme) is used without greatly increasing RS overhead as compared with one OFDM symbol DMRS. This scheme may be regarded as a scheme similar to the above-described basic DMRS/additional DMRS scheme.

Figure 8:
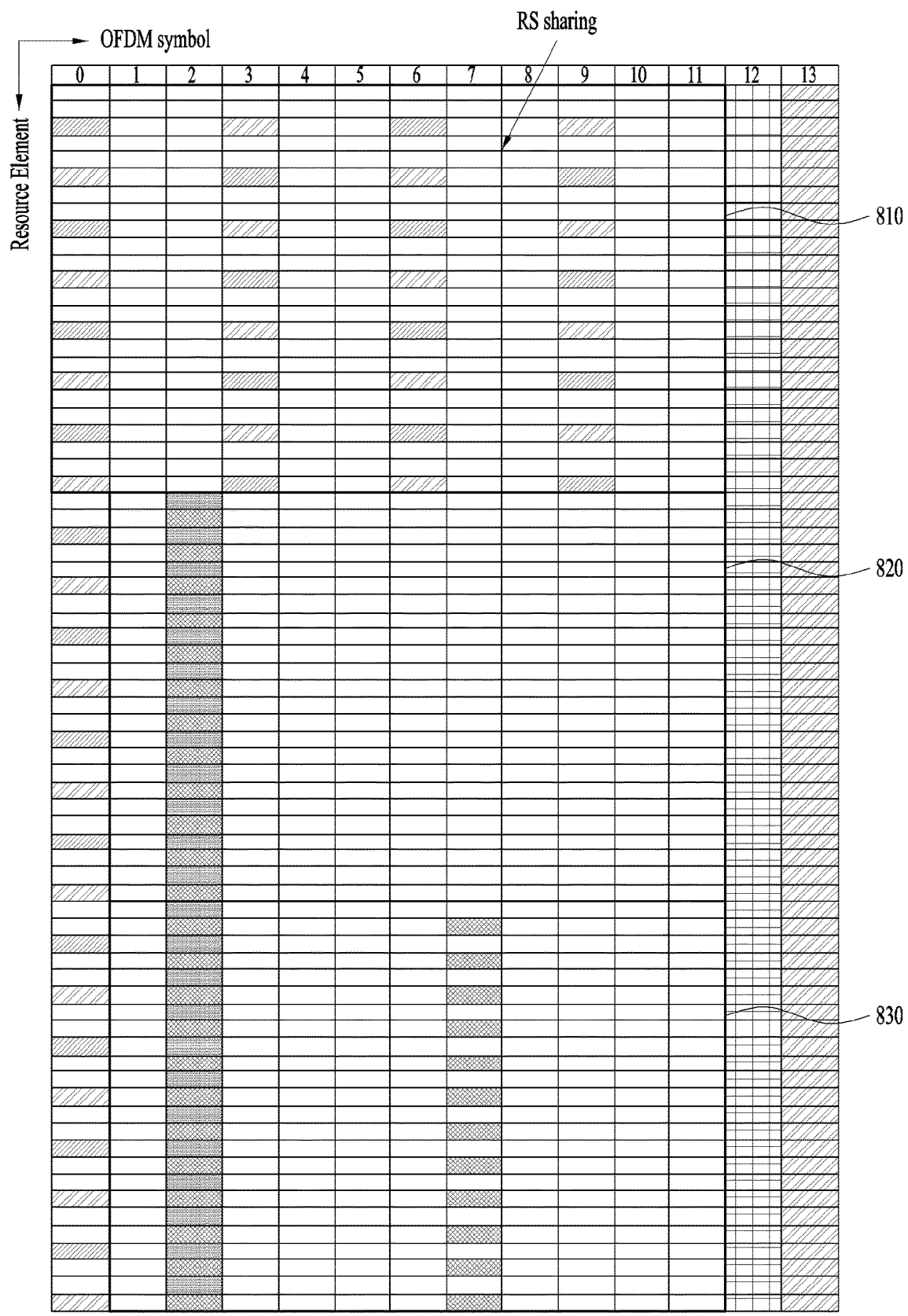
FIG. 8 is a diagram illustrating a method of sharing an RS by a control channel and a data channel according to an embodiment of the present invention.

FIG. 8 is a diagram illustrating a method of sharing an RS by a control channel and a data channel according to an embodiment of the present invention.

In FIG. 8, an RB 810 represents an RB in which RS sharing described above is performed and RBs 820 and 830 represent normal RBs in which RS sharing is not used.

In a data channel region for a UE or a UE group that shares an RS of a control channel in a data channel, it is desirable that an RS similar or equal to the control channel RS be additionally transmitted. That is, FIG. 8 illustrates transmission of an RS having the same pattern as the RS in the control channel.

Such a structure may be indicated for operation. To this end, an indicator may be defined in contents of a control signal.

Alternatively, the control channel RS may always be additionally transmitted in the data channel region for the UE or the UE group that shares the control channel RS in the data channel.

It is desirable that the eNB indicate which RS the UE should use. For example, the eNB may indicate whether the UE should use an RS defined in the control channel or an RS defined in a DMRS region.

Alternatively, an RS to be used may be determined according to attributes of a shared channel transmitted to the UE. For example, in linkage with a Radio Network Temporary Identifier (RNTI) of DCI that transmits system information or a random access response, the RS of the control RS may be shared in a data channel indicated by DCI detected through the RNTI.

Hereinbelow, a detailed transmission structure of an NR DMRS will be described based on the above description.

According to an embodiment of the present invention, an NR DMRS allocates resources so as to transmit a maximum of N(=8) APs through a single OFDM symbol. Multiplexing between APs may be performed by a Frequency-Division Multiplexing (FDM)-Code-Division Multiplexing (CDM) scheme. It is proposed that REs per AP be configured to have 2 or 3 RE resources in a unit RB and have a maximum of 2N (=16) REs or 3N(=24) REs per RB. The number of effective REs per AP may be differently allocated according to the number of layers.

Design Criteria

Maximum spectral efficiency demanded in an NR system is 30 bps/Hz (for DL) or 15 bps/Hz (for UL) which is the same as spectral efficiency of 3GPP LTE-A. In LTE-A, modulation of 64 QAM, 8 transmission layers (for DL) and 4 transmission layers (for UL), and requirements of 30 bps/Hz (for DL) and 15 bps/Hz (for UL) have been accomplished. Likewise, upon considering a spectral efficiency requirement in the NR system, it is desirable that a maximum number of transmission layers be 8 (for DL) and 4 (for UL). While the number of eNB antennas increases, the number of APs may increase and it is assumed that a maximum value of layers that can be transmitted by the eNB is 16. In addition, it is also assumed that a maximum number of layers that can be received by the eNB is 16.

Assumption of the number of point-to-point transmission layers
For Single User (SU) transmission: a maximum of 8 layers (for DL), a maximum of 4 layers (for UL),
For Multi-User (MU) transmission: a maximum of 4 layers (for DL), a maximum of 4 layers (for UL)
Assumption of a maximum number of layers for eNB transmission/reception
a maximum of 16 layers (for DL), 8 layers (for UL)

In this case, an NR DMRS is designed under the following assumption.

A maximum of 8 APs is supported per UE.
A maximum of 16 APs that can perform simultaneous transmission is supported.
Resources are configured to distinguish between a maximum of 8 APs on one OFDM symbol
A minimum of energy of 2 REs or 3 REs is included per AP.

This means that 2 REs per AP are used when 16 REs are used for 8 APs and that 3 REs per AP are used when 24 REs are used for 8 APs. In this design, it is assumed that an RB includes 16 REs or 24 REs which are a multiple of 8.

Method of Performing Multiplexing on Single OFDM Symbol

A method of multiplexing a plurality of APs on one OFDM symbol includes an FDM method using different frequency resources per AP and a CDM method using separate code resources on the same resource.

Figure 9:
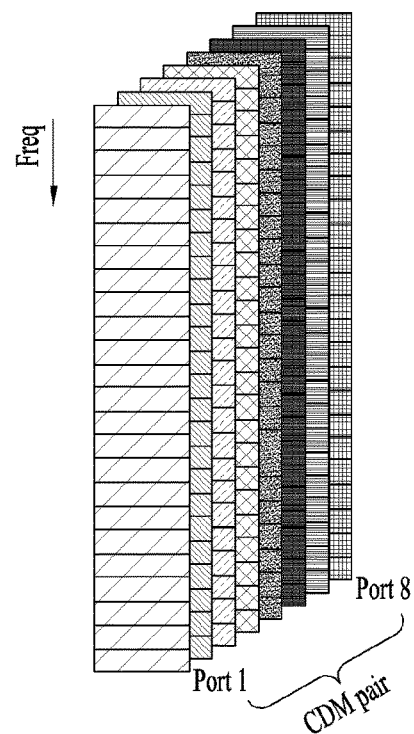
FIG. 9 is a diagram for explaining a method of spreading a DMRS on N REs using a CDM scheme and transmitting the DMRS using 8 orthogonal codes according to an embodiment of the present invention.

FIG. 9 is a diagram for explaining a method of spreading a DMRS on N REs using a CDM scheme and transmitting the DMRS using 8 orthogonal codes according to an embodiment of the present invention.

That is, FIG. 9 illustrates an example of using orthogonal codes on N REs. All APs share a length-N scrambling sequence (e.g., a PN sequence, CAZAC, etc.) used in an allocated band and 8 length-N orthogonal sequences (e.g., Discrete Fourier Transform (DFT) or Hadamard) are allocated to the APs.

Figure 10:
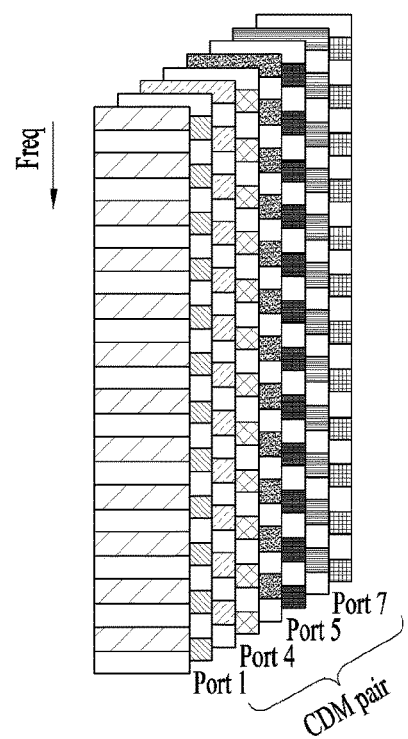
FIG. 10 is a diagram for explaining a method of using a combination of FDM and CDM according to an embodiment of the present invention.

FIG. 10 is a diagram for explaining a method of using a combination of FDM and CDM according to an embodiment of the present invention.

FIG. 10 illustrates an example of using frequency resources and orthogonal codes on N REs. The N REs are divided into N/2 REs according to an even number and an odd number. In each group, orthogonal codes for distinguishing between 4 APs are used. In a length-N scrambling sequence (e.g., a PN sequence, CAZAC, etc.) used in an allocated band, two subset sequences are used as an even number index and an odd number index and the subset sequences are shared by the APs. 4 length-N/2 orthogonal sequences (e.g., DFT or Hadamard) are allocated to the APs.

A length-N/2 scrambling sequence used in the allocated band is equally used on two frequency resources and 4 length-N/2 orthogonal sequences are allocated to the APs.

Figure 11:
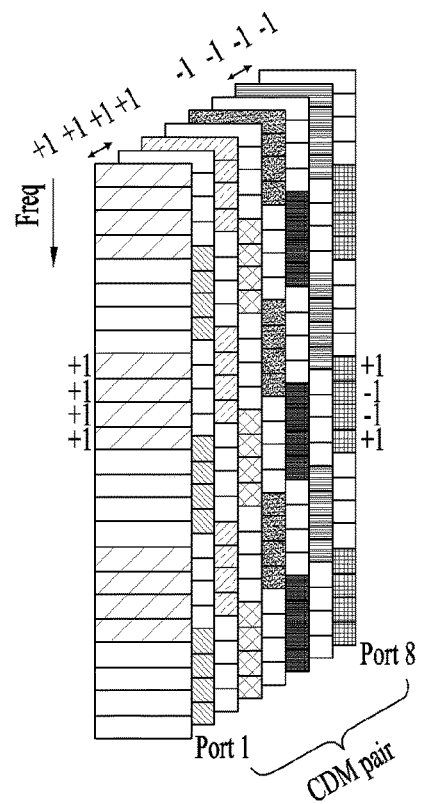
FIG. 11 is a diagram for explaining a method of using a combination of FDM and OCC according to an embodiment of the present invention.

FIG. 11 is a diagram for explaining a method of using a combination of FDM and Orthogonal Cover Code (OCC) according to an embodiment of the present invention.

FIG. 11 illustrates an example of using frequency resources and orthogonal codes on N REs. A group of 4 consecutive frequency resources is generated and 4 orthogonal code resources are allocated to 4 APs in the frequency resource group. Another frequency resource group is generated on 4 continuous REs and 4 orthogonal code resources are allocated to 4 different APs. If N REs are used per RB, a total of N/4 resource groups each having 4 contiguous frequencies is generated and resource groups separated at an interval of 4 REs are used by 4 APs. Length-N/4 scrambling sequences defined in a corresponding RB are used in N/4 frequency groups, respectively.

Figure 12:
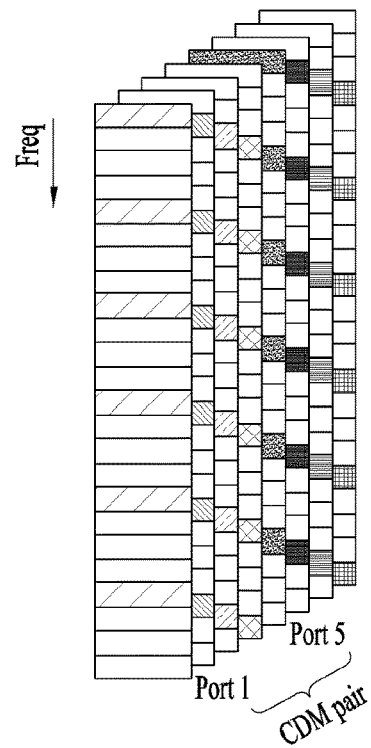
FIG. 12 is a diagram for explaining a method of using a combination of FDM and CDM according to another embodiment of the present invention.

FIG. 12 is a diagram for explaining a method of using a combination of FDM and CDM according to another embodiment of the present invention.

A total of 4 frequency resource groups is generated using resources having an interval of 4 REs as a frequency group. Two APs are distinguished by orthogonal resources in each of the 4 frequency resource groups.

A length-N scrambling sequence defined in a corresponding RB is mapped to every RE and different scrambling sequences may be mapped to frequency resource groups. OCC-2 ([+1 +1], [+1 −1]) may be used as two orthogonal resources.

A length-N/4 scrambling sequence defined in a corresponding RB is mapped to REs belonging to a frequency resource group and frequency resource groups may use the same scrambling sequence as a base sequence. A special offset sequence may be introduced to the frequency resource groups. OCC-2 ([+1 +1], [+1 −1]) may be used as two orthogonal resources.

Figure 13:
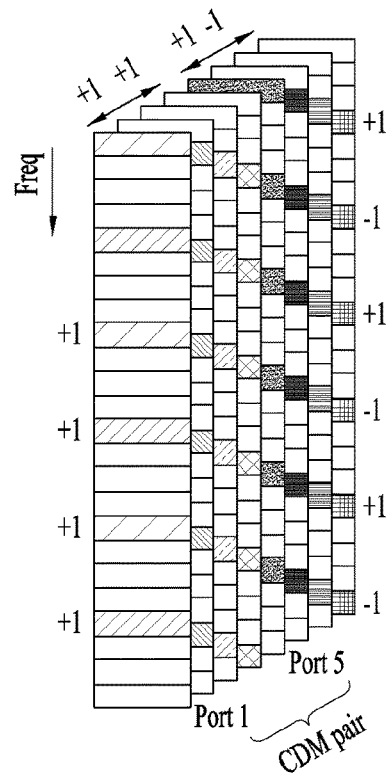
FIGS. 13 and 14 are diagrams for explaining a method of using a combination of FDM and OCC according to another embodiment of the present invention.
Figure 14:
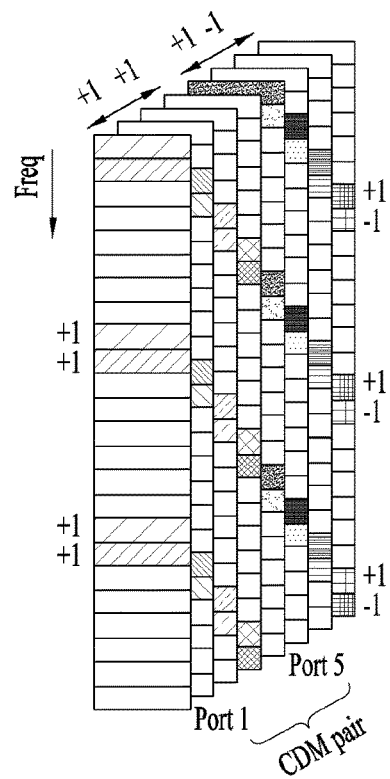

FIGS. 13 and 14 are diagrams for explaining a method of using a combination of FDM and OCC according to another embodiment of the present invention.

A total of frequency resource groups is generated using resources having an interval of 4 REs as a frequency group. Two APs are distinguished by orthogonal resources in each of the 4 frequency resource groups.

In FIG. 14, two contiguous REs are a unit for applying an OCC and a total of 4 OCC groups is generated on 8 REs. A length-N/2 scrambling sequence defined in a corresponding RB is mapped to each OCC group.

Figures 15, 16:
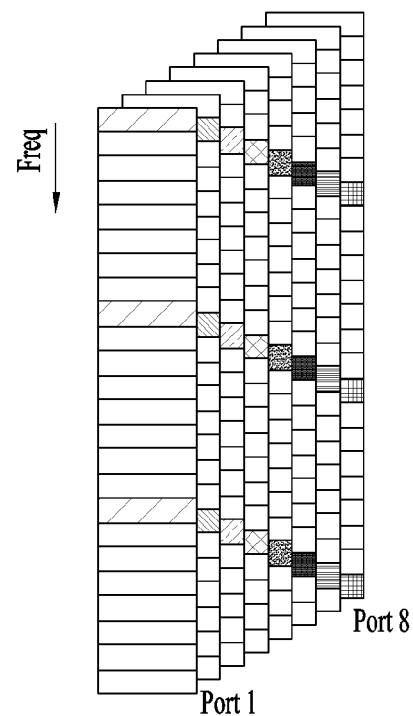
FIG. 15 is a diagram for explaining a method of using FDM and arranging 8 REs per AP according to another embodiment of the present invention.
FIG. 16 is a diagram illustrating a scheme of applying FDM and CDM according to an embodiment of the present invention.

FIG. 15 is a diagram for explaining a method of using FDM and arranging 8 REs per AP according to another embodiment of the present invention.

The number of REs per AP may be fixed regardless of the number of layers (e.g., N REs/maximum number of APs). Meanwhile, the number of REs per AP is variable according to the number of layers (e.g., single layer: 24 REs per AP, two layers: 12 REs per AP, three layers: 8 REs per AP, four layers: 6 REs per AP, six layers: 4 REs per AP, and eight layers: 3 REs per AP). For 5 layers, 5 APs may be used in a DMRS pattern for 6 layers. For 7 layers, 7 ports may be used in a DMRS pattern for 8 layers.

While the above methods have described DMRS resource allocation methods for a maximum of 8 APs, a resource allocation method for fewer APs than 8 APs may be used. For example, when it is assumed that a maximum of 4 APs is present, a subset of the above methods may be used. If APs are extended (e.g., up to 8 APs), one OFDM symbol may be further used. For example, APs may be distinguished by applying OCC-2 to two OFDM symbols. Table 1 shown below assumes that 8 APs are present on 24 REs in LTE-A.

TABLE 1

| | Number of APs | | | | | | |
|---|---|---|---|---|---|---|---|
| 1 | 2 | 3 | 4 | 5 | 6 | 7 | 8 |
| RE/ AP | 12 | 6, 6 | 6, 6 | 6, 6 | 3, 3, 6 | 3, 3, 3 | 3, 3, 3, 3 | 3, 3, 3, 3 |
| | | 6 | 12 | 6, 6 | 6 3 | 3 3 3 | 3, 3, 3 | 3, 3, 3, 3 |

Sequence for CDM

A legacy LTE UL DMRS uses a Zadoff-Chu (ZC) sequence as a base sequence, uses a 12-interval DFT vector $(\exp(j*2*pi*n*k/12))$ in order to apply a time domain cyclic shift, and uses 8 vectors among 12 orthogonal vectors. This is repeatedly applied in units of 12 REs.

In a new system, as a method of multiplexing 8 orthogonal DMRS APs to one OFDM symbol, a method of applying CDM or OCC in the frequency domain may be considered.

(1) In case of applying a cyclic shift in the time domain, an 8-interval DFT vector is used $(\exp(j*2*pi*n*k/8))$. This is advantageous in that an impulse response for a radio channel of each of 8 layers causes the respective layers to be separately arranged at a maximum interval in the time domain.

In particular, the above case may be applied to a pattern using 8 orthogonal DMRS APs by CDM.

As an orthogonal sequence, Hadamad-8 may be applied.

In this case, if 12 REs are defined as one RB, when a length-8 vector is arranged on 12 REs, a vector of one cycle and a part of the vector are mapped. For example, when the length-8 vector is [Sn(0) Sn(1) Sn(2) Sn(3) Sn(4) Sn(5) Sn(6) Sn(7)], an order of mapping to 12 REs may be as follows.

12-RE mapping: [Sn(0) Sn(1) Sn(2) Sn(3) Sn(4) Sn(5) Sn(6) Sn(7) Sn(0) Sn(1) Sn(2) Sn(3)]

As a method of causing sequences mapped to multiple RBs to have consecutive phases, a mapping relationship may be configured according to the number of RBs.

TABLE 2

| | 0 1 2 3 4 5 6 7 8 9 10 11 |
|---|---|
| Even (/Odd) number RB | [Sn(0) Sn(1) Sn(2) Sn(3) Sn(4) Sn(5) Sn(6) Sn(7) Sn(0) Sn(1) Sn(2) Sn(3)] |
| Odd (/Even) number RB | [Sn(4) Sn(5) Sn(6) Sn(7) Sn(0) Sn(1) Sn(2) Sn(3) Sn(4) Sn(5) Sn(6) Sn(7)] |

(2) In case of applying a cyclic shift in the time domain, a 4-interval DFT vector is used $(\exp(j*2*pi*n*k/4))$. This is advantageous in that an impulse response for a radio channel of each of 4 layers causes the respective layers to be separately arranged at a maximum interval in the time domain.

In particular, the above case may be applied to a pattern using 4 orthogonal DMRS APs by CDM.

If an orthogonal DMRS AP is defined using FDM and CDM and 12 REs are defined as one RB, 4 DMRS APs may be distinguished by applying CDM in units of 6 REs and another 4 DMRS APs may be defined on another 6 REs. In this case, if a length-4 vector is mapped to 6 REs, one cycle of a vector and a half cycle of the vector are mapped in a similar manner to the above described mapping. Similarly, as a method of causing sequences mapped to multiple RBs to have consecutive phases, a mapping relationship may be configured according to the number of RBs.

TABLE 3

| | 0 1 2 3 4 5 6 7 8 9 10 11 |
|---|---|
| Even (/Odd) number RB | [Sn(0) - Sn(1) - Sn(2) - Sn(3) - Sn(0) - Sn(1) -] |
| Odd (/Even) number RB | [Sn(2) - Sn(3) - Sn(0) - Sn(1) - Sn(2) - Sn(3) -] |

Method of Applying FDM and CDM

In resource mapping for configuring 12 REs as one RB, 6 REs may distinguish between 4 APs and another 6 REs may distinguish between another 4 APs by CDM.

FIG. 16 illustrates a scheme of applying FDM and CDM according to an embodiment of the present invention.

Specifically, (A) of FIG. 16 illustrates a scheme of grouping two consecutive REs and arranging groups at an interval of 2 REs. Meanwhile, (B) of FIG. 16 illustrates a scheme of grouping REs having an interval of 2 REs.

In each of two groups G1 and G2, 4 APs are distinguished. In this case, the above-described CDM code may be applied to each group.

When multi-user transmission is used in DL transmission, an eNB may allocate DMRS APs for channel estimation of multiple users in FDM and CDM groups. The eNB may indicate DMRS APs that respective users are to use and basically designates DMRS APs used by individual users. When multiple users receive allocated DMRS APs, if a UE is aware of information about DMRS APs used by other users, there is a probability of improving channel estimation performance.

For example, if the UE receives two allocated DMRS APs and two sequences are selected in CDM, the UE may distinguish between the two DMRS APs by averaging REs in units of 2 REs. Since the other two sequences in CDM may be allocated to other UEs, the corresponding UE may distinguish between the two DMRS APs by averaging REs in units of 4 REs.

When frequency selectivity of a radio channel is considered, it is desirable to average REs which are located as near as possible. It can be expected that averaging two REs obtains better channel estimation performance than averaging four REs. In multi-user transmission, if the eNB informs a UE of information regarding multi-user multiplexing or information about the length of CDM, the UE may adjust an averaging unit during channel estimation. For example, an indicator informing the UE whether CDM-2 (length-2 orthogonal resource) or CDM-4 (length-4 orthogonal resource) is used may be configured.

Figure 17:
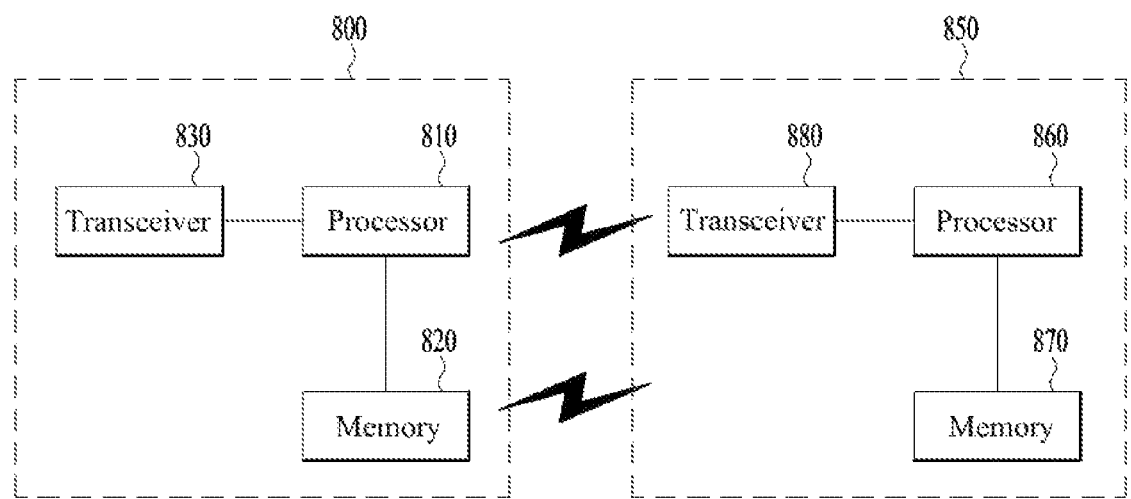
FIG. 17 is a diagram for explaining an apparatus for implementing the above-described method

FIG. 17 is a diagram for explaining an apparatus for implementing the above-described method.

A wireless apparatus 800 of FIG. 17 may correspond to the above-described specific UE and a wireless apparatus 850 of FIG. 17 may correspond to the above-described eNB.

The UE 800 may include a processor 810, a memory 820, and a transceiver 830 and the eNB 850 may include a processor 860, a memory 870, and a transceiver 880. The transceivers 830 and 880 may transmit/receive a wireless signal and may be implemented in a physical layer of 3GPP. The processors 810 and 860 are implemented in a physical layer and/or a MAC layer and are respectively connected to the transceivers 830 and 880. The processors 810 and 860 may perform the above-mentioned reference signal transmission procedure.

The processors 810 and 860 and/or the transceivers 830 and 880 may include an Application-Specific Integrated Circuit (ASIC), a chipset, a logical circuit, and/or a data processor. The memories 820 and 870 may include a Read-Only Memory (ROM), a Random Access Memory (RAM), a flash memory, a memory card, a storage medium, and/or a storage unit. If an embodiment is performed by software, the above-described methods may be executed in the form of a module (e.g., a process or a function) performing the above-described function. The module may be stored in the memories 820 and 870 and executed by the processors 810 and 860. The memories 820 and 870 may be located at the interior or exterior of the processors 810 and 860 and may be connected to the processors 810 and 860 via known means.

The present invention described above may be applied not only to the NR system but also to other wireless systems having various requirements.

The detailed description of the exemplary embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

What is claimed is:

1. A method for a user equipment (UE) to receive a CSI-RS (Channel Status Information-Reference Signal) from a network in a wireless communication system, the method comprising:
    receiving, from the network, a signal related to whether the CSI-RS is a single shot CSI-RS or multi-shot CSI-RSs;
    upon the signal being related to multi-shot CSI-RSs, receiving, from the network, the usage multi-shot CSI-RSs on multiple OFDM (Orthogonal Frequency Divisional Multiplexing) symbols based on a premise that there is no variation in beamforming for the multi-shot CSI-RSs on the multiple OFDM symbols; and
    performing, by the UE, a measurement based on the multi-shot CSI-RSs received on the multiple OFDM symbols.

2. The method of claim 1, wherein the multi-shot CSI-RSs are received on 2 consecutive time domain units, wherein the 2 consecutive time domain units are periodically defined.

3. The method of claim 2, wherein the multi-shot CSI-RSs are received on 2 OFDM symbols at each of the 2 consecutive time domain unit.

4. The method of claim 1,
    wherein the multi-shot CSI-RSs are received on 2 OFDM symbols at each of 2 time domain units; and
    wherein the 2 OFDM symbols are separated from each other.

5. The method of claim 1, further comprising:
    receiving a single-shot CSI-RS from the network;
    receiving a DMRS (Demodulation Reference Signal) from the network; and
    receiving, from the network, a signal indicating a QCL (Quasi Co-Located) condition between one or more downlink reference signals including one or more of the single-shot CSI-RS, the multi-shot CSI-RSs and the DMRS.

6. A user equipment (UE) receiving a CSI-RS (Channel Status Information-Reference Signal) from a network in a wireless communication system, the UE comprising:
    a transceiver configured to receive, from the network, a signal related to whether the CSI-RS is a single shot CSI-RS or multi-shot CSI-RS; and
    a processor configured to, upon the signal being related to multi-shot CSI-RSs, control the transceiver to receive the multi-shot CSI-RSs based on a premise that there is no variation in beamforming for the multi-shot CSI-RS, and to perform a measurement based on the multi-shot CSI-RSs received on the multiple OFDM symbols.

7. The UE of claim 6, wherein the processor controls the transceiver to receive the multi-shot CSI-RSs on 2 consecutive time domain units, wherein the 2 consecutive time domain units are periodically defined.

8. The UE of claim 7, wherein the processor controls the transceiver to receive the multi-shot CSI-RSs on 2 OFDM symbols at each of the 2 consecutive time domain units.

9. The UE of claim 6,
    wherein the multi-shot CSI-RSs are received on 2 OFDM symbols at each of 2 time domain units; and
    wherein the 2 OFDM symbols are separated from each other.

10. The UE of claim 6,
    wherein the transceiver further receives a single-shot CSI-RS, a DMRS (Demodulation Reference Signal), and a signal indicating a QCL (Quasi Co-Located) condition from the network, and
    wherein the processor processes based on the QCL condition one or more downlink reference signals including one or more of the single-shot CSI-RS, the multi-shot CSI-RSs and the DMRS.

* * * * *

UNITED STATES PATENT AND TRADEMARK OFFICE
CERTIFICATE OF CORRECTION

PATENT NO. : 10,805,137 B2  
APPLICATION NO. : 16/250293  
DATED : October 13, 2020  
INVENTOR(S) : Hyunsoo Ko Page 1 of 1

It is certified that error appears in the above-identified patent and that said Letters Patent is hereby corrected as shown below:

In the Claims

Column 15, Line 41, change "the usage multi-shot CSI-" to --the multi-shot CSI- --.

Signed and Sealed this  
Twenty-ninth Day of December, 2020

Andrei Iancu  
*Director of the United States Patent and Trademark Office*